July 12, 1966  R. C. BRIDGEMAN  3,260,924
DIRECT CURRENT VOLTAGE CONVERTER
Filed Feb. 10, 1964  2 Sheets-Sheet 1

INVENTOR.
RICHARD C. BRIDGEMAN
BY

ATTORNEY

July 12, 1966 R. C. BRIDGEMAN 3,260,924
DIRECT CURRENT VOLTAGE CONVERTER
Filed Feb. 10, 1964 2 Sheets-Sheet 2

INVENTOR.
RICHARD C. BRIDGEMAN
BY
ATTORNEY

United States Patent Office 3,260,924
Patented July 12, 1966

3,260,924
DIRECT CURRENT VOLTAGE CONVERTER
Richard C. Bridgeman, Clarendon Hills, Ill., assignor to Vapor Corporation, Chicago, Ill., a corporation of Delaware
Filed Feb. 10, 1964, Ser. No. 343,831
4 Claims. (Cl. 323—18)

This invention relates in general to a direct current voltage converter for transforming direct current voltage at one level to direct current voltage at a lower level, and more particularly to a direct current voltage converter capable of receiving a variable voltage input and of transforming it to a lower relatively constant but adjustable voltage output.

With the advent of the semi-conductor market, electronic conversion of direct current voltage has become increasingly desirable. Heretofore, the most commonly used method of converting a source voltage to a lower one has been by utilization of serially connected resistors. While this method has been initially inexpensive, it results in materially lower efficiency and therefore more frequent charging of a battery employed for source voltage per usable output.

Accordingly, it is an object of the present invention to obviate the above named difficulties and provide a direct current voltage converter that may be simply and easily constructed, and that will yet provide a high efficiency output voltage.

Another object of the present invention is to provide a direct current voltage converter that is capable of producing a high efficiency output voltage that is variable throughout a wide range and which may be regulated.

Still another object of this invention is in the provision of a direct current voltage converter that is tolerant of a wide range of voltages and a wide range of power levels.

A further object of this invention is to provide a converter for converting direct current power at one voltage to a direct current power at another voltage, while performing this function statically, reliably, with an absolute minimum number of parts and components, and with high energy efficiency.

A still further object of this invention resides in the provision of a converter for converting direct current power at one voltage to direct current power at another voltage, wherein the output voltage may be infinitely variable from a very low value up to and including the input voltage, and further wherein the output voltage is controllable and/or regulatable at a set value.

Other objects, features and advantages of the invention will be apparent from the following detailed disclosure, taken in conjunction with the accompanying sheets of drawings, wherein like reference numerals refer to like parts, in which.

Figure 1:
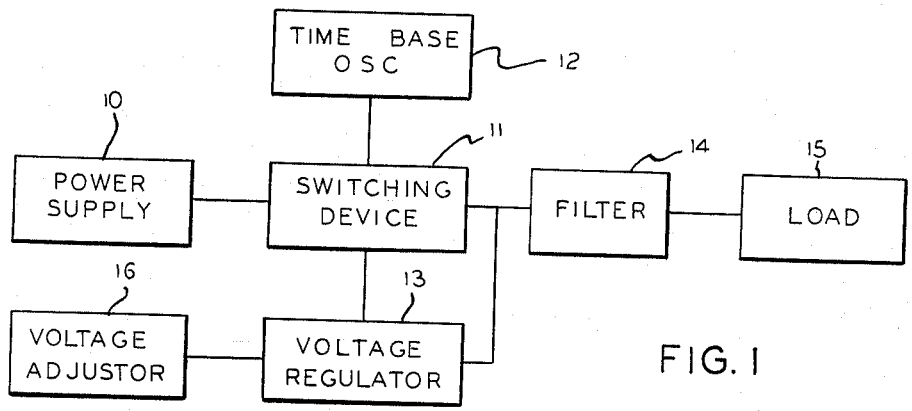
FIG. 1 is a block diagram of the direct current voltage converter of the present invention.

Referring now to the drawings and particularly to FIG. 1, the present invention is generally shown in block diagram form, wherein a power supply or source 10 feeds to a switching device 11 that is operated by a time base oscillator 12 and a voltage regulator 13 to produce a pulsating voltage that is transformed to a smooth voltage by a filter 14 to thereby feed a lower voltage to a load 15. A voltage adjustor 16 controls through the voltage regulator the voltage output to the load 15.

Figure 2A:
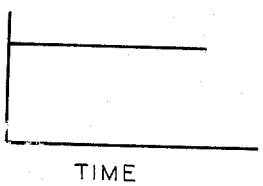
FIGS. 2A, 2B and 2C illustrate graphically the steps in converting the source voltage to a considerably lower voltage in accordance with the present invention.
Figure 3A:
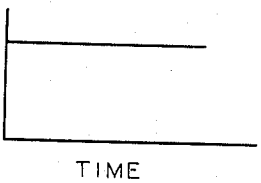
FIGS. 3A, 3B and 3C illustrate graphically the steps in converting the source voltage to a slightly lower voltage in accordance with the present invention.
Figure 2B:
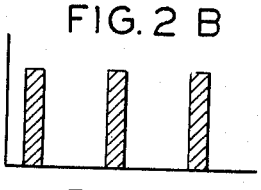
Figure 3B:
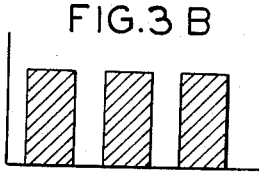
Figure 2C:
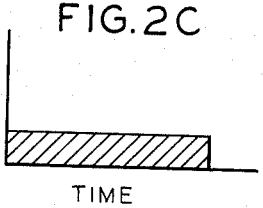
Figure 3C:
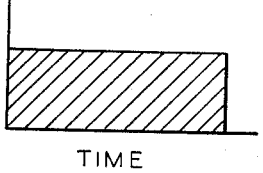

The work of the converter of the present invention is illustrated graphically in FIGS. 2A, 2B and 2C wherein the source voltage is shown converted to a considerably lower voltage; and in FIGS. 3A, 3B and 3C wherein the source voltage is converted to a slightly lower voltage. In these graphs the ordinates represent voltage while the abscissas represent time. Further, FIGS. 2A and 3A represent the source voltage or input to the converter, while FIGS. 2B and 3B represent the pulsating voltage produced after switching, and while FIGS. 2C and 3C represent the output voltage of the converter after filtering. Thus, the graphical illustrations show that where a relatively longer "off" time interval of the time base is employed, a lower output voltage is produced. Conversely, the longer the "on" time interval of the time base, the greater the value of the output voltage. This is commonly referred to as pulse width modulation. Accordingly, by varying the time interval in switching, the output voltage can be infinitely varied from a very low value up to and substantially equal to the input source voltage.

Figure 4:
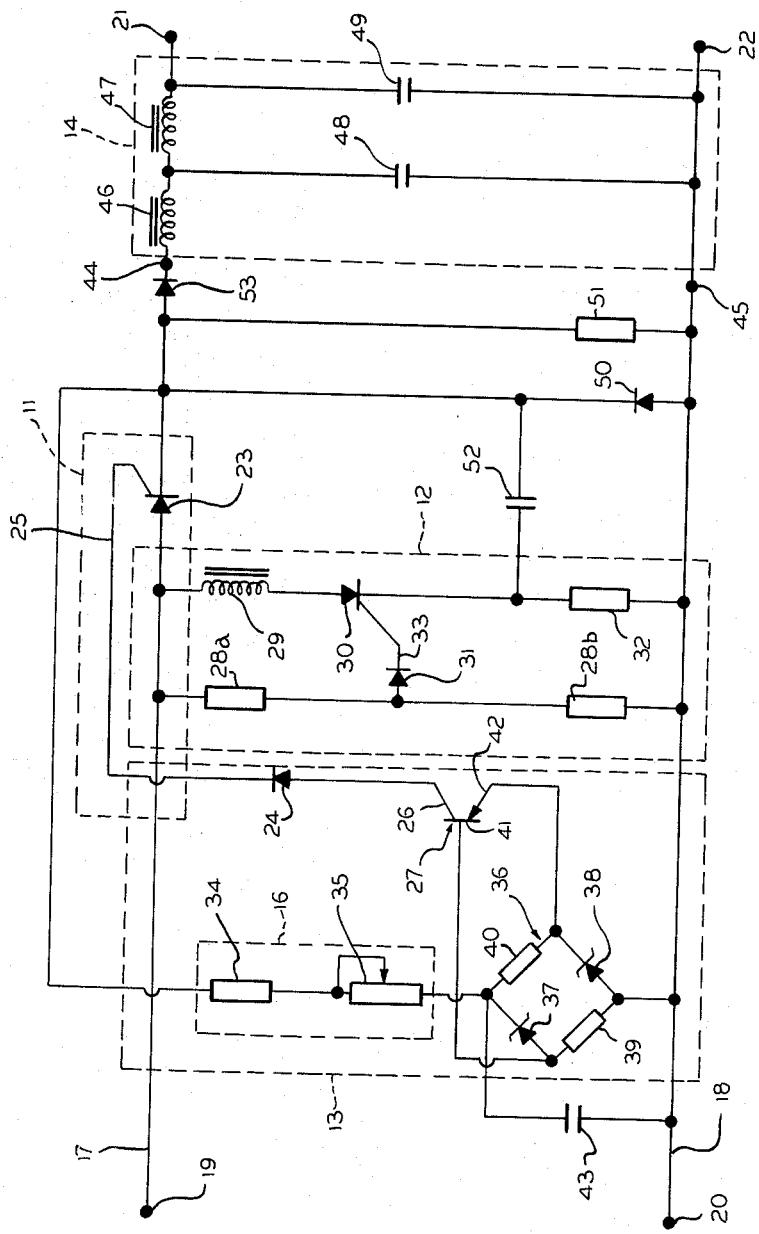
FIG. 4 is a schematic electrical diagram of one embodiment of the present invention.

Referring now to the schematic diagram of FIG. 4, and it should be appreciated that the components therein may be changed or substituted in accordance with known electronic circuitry construction, the power lines are represented by the upper and lower lines 17 and 18, respectively, wherein the voltage source or power source, such as a battery or the like, is connected across the terminals 19 and 20 to provide the input voltage to the converter, and wherein the load receiving the output voltage is connected across the terminals 21 and 22.

The switching device 11 capable of interrupting the input voltage includes a silicon controlled rectifier 23, and the input of the rectifier is connected to the power line 17 on the input voltage side, while the output is connected to the power line 17 on the output side. A diode 24 is connected in the control line 25 extending between the rectifier and the collector 26 of a PNP transistor 27 located in the voltage regulator 13.

The silicon controlled rectifier 23 receives a turnoff signal from the time base oscillator 12 periodically, and preferably every millisecond. The time base oscillator 12 includes a voltage divider having a resistor 28a and a resistor 28b serially connected between the power lines 17 and 18, a choke 29, a silicon controlled rectifier 30, a diode 31, and a resistor 32, all connected in series between the power lines 17 and 18, and wherein a control line 33 extends from the silicon controlled rectifier 30 through the diode 31 to a point between the resistors 28a and 28b. While this oscillator provides a turnoff operable to turn off the switching silicon controlled rectifier 23 every millisecond, it should be appreciated that any other switching rate might be employed. However, this switching rate was chosen fast enough so that filtering would not constitute a severe problem, and yet slow enough to permit oscillator construction simplicity.

When the silicon controlled rectifier 23 is on and the silicon controlled rectifier 30 is off, the right side of the commutating condenser 52 is at the positive potential of line 17, while the left side of the condenser is at one-half of the potential of line 17 as dictated by the voltage divider of resistances 28a and 28b, thereby charging the right side of the condenser. When the rectifier 30 is turned on, it connects the left side of the condenser 52 to the positive potential of line 17 through the choke 29, while the right side of the condenser finds itself at about one and one-half the positive potential thereby placing the cathode of the rectifier 23 at a much higher potential than the anode thereof to cause the current to attempt to back up through the rectifier 23, thereby turning off this rectifier. Since the right side of the condenser 52 is no longer connected to the postive potential of line 17, it discharges through the resistor 51, whereby the cathode potential of the rectifier 23 starts to fall off. The cathode of the rectifier 30 will swing, whereby if it is below about one-half the positive potential of line 17, the rectifier 30 will be on, and if the cathode is above about one-half the positive potential of line 17, the diode 31 will lock the gate of the rectifier 30 thereby conditioning same so that it then can turn off. While the rectifier 30 is on, the left side of the condenser 52 becomes charged to the potential of line 17, and the choke 29 continues to deliver current to the condenser 52 and thereby forcing the left side of the condenser to the positive potential of line 17 plus a few volts. Now the cathode of the rectified 30 is at a higher potential than the anode thereof, thereby causing the rectifier 30 to turn off. Since the condenser 52 is no longer connected to the positive potential of line 17, it discharges through the resistor 32, whereby the cathode potential of the rectifier 30 starts to fall until it reaches about one-half the positive potential of line 17 minus a few volts to allow the rectifier 30 to be gated and turned back on through the fixed voltage of the voltage divider consisting of the resistors 28a and 28b.

In general, the voltage adjustor 16 may be considered part of the voltage regulator, and this adjustor includes a voltage divider having a fixed resistor 34 and a variable resistor or rheostat 35 connected in series. Additionally, the voltage regulator includes a voltage sensitive bridge 36 having a pair of zener diodes 37 and 38 and a pair of fixed resistors 39 and 40. The output of the voltage sensitive bridge 36 is connected in the base emitter circuit of the transistor 27, wherein one side of the bridge is connected to the base 41 and the other side to the emitter 42. The voltage sensitive bridge is also connected between the voltage divider of resistors 34 and 35 and the power line 18. A capacitor 43 is connected between the voltage divider and voltage sensitive bridge and the power line 18, and coacts with the resistors 34 and 35 to function as a filter for the output of the rectifier 23 to define the average voltage at terminals 44 and 45 for comparison to the set value across the voltage regulator 13.

Therefore a pulsating voltage is provided at the output terminals 44 and 45 which is thereafter transformed to a continuous or smooth voltage by the filter 14. The filter 14 includes chokes 46 and 47 and capacitors 48 and 49. If a smoother voltage is desired, additional chokes and capacitors may be added to the circuit.

Additional elements include a diode 50 and a resistor 51, each of which is connected across the power lines 17 and 18 between the switching rectifier 23 and the output terminals 44 and 45, and a capacitor 52 connected between the output side of the diode 50 and the resistor 32 and the silicon controlled rectifier 30, and a protective diode 53 is provided in the power line 17 between the switching rectifier 23 and the chokes 46 and 47.

In operation, the time base oscillator 12 sends a turn-off signal to the switching rectifier 23 to thereby interrupt the input voltage. If the average voltage at the output terminals 44 and 45 is higher than the set value as adjusted by the voltage adjustor and across the voltage regulator 13, there will be no signal on the electronic gate as provided by the transistor 27, and the switching rectifier 23 will turn off and remain off. However, if the average voltage at the output terminals 44 and 45 is lower than the set voltage of the regulator, there will be a signal impressed on the transistor 27 from the voltage regulator to thereby turn the switching rectifier 23 back on. The voltage divider and voltage adjusting rheostat provide a variable step down to the voltage sensitive bridge so that the voltage can be varied. The plus or minus output from the sensitive bridge 36 drives the transistor 27 which gates the switching rectifier 23. The average output voltage is detected at the input of the filter 14 in order to avoid the time delay that would be introduced by the filter which would result in unstable voltage regulation. And the pulsating voltage at the output terminals 44 and 45 will be transformed to a smooth or continuous direct current voltage by the filter 14 for use by the load at the output terminals 21 and 22. The output voltage at the terminals 21 and 22 is regulated in accordance with the set value established by the voltage adjustor 16 and the rheostat 35.

From the foregoing, it can be appreciated that the present invention provides a converter capable of transforming a direct current voltage from a power source to a lower direct current voltage, wherein the lower direct current output voltage is efficiently produced, and yet controllable and regulatable.

It will be understood that modifications and variations may be effected without departing from the scope of the novel concepts of the present invention, but it is understood that this application is to be limited only by the scope of the appended claims.

The invention is hereby claimed as follows:

1. A direct current converter for transforming direct current voltage at one level to direct current voltage at a lower level, said converter comprising input and output terminals, a first silicon controlled rectifier connected in series between the input and output terminals for interrupting the voltage at said one level to produce a pulsating direct current voltage, a time base oscillator connected in parallel with said first silicon controlled rectifier for turning off the same periodically, said oscillator including a choke, a second silicon controlled rectifier and a resistor in series across the input terminals at the input end of the first rectifier, and voltage divider means between said input terminals to constantly impose on the gate of said second rectifier a portion of the voltage at said one level, a commutating condenser between the output ends of said rectifiers, means at the output end of said first rectifier to produce an average output voltage, and detector means for detecting the average output voltage at the output end of said first rectifier to impose a turn-on voltage on the gate of said first rectifier.

2. The converter as defined in claim 1, wherein said detector means includes a voltage divider and a voltage sensitive bridge.

3. The converter as defined in claim 2, wherein said voltage divider is adjustable.

4. The converter as defined in claim 1, and filter means between the output end of the first rectifier and said output terminals.

References Cited by the Examiner

UNITED STATES PATENTS

| | | | |
|---|---|---|---|
| 3,040,239 | 6/1962 | Walker | 323—24 |
| 3,169,232 | 2/1965 | Engman | 323—9 |
| 3,174,096 | 3/1965 | Lichowsky | 323—22 |

JOHN F. COUCH, *Primary Examiner.*

LLOYD McCOLLUM, *Examiner.*

K. D. MOORE, *Assistant Examiner.*